(12) United States Patent
Khan et al.

(10) Patent No.: US 7,206,280 B1
(45) Date of Patent: Apr. 17, 2007

(54) METHOD AND APPARATUS FOR ASYNCHRONOUS INCREMENTAL REDUNDANCY RECEPTION IN A COMMUNICATION SYSTEM

(75) Inventors: Farooq Ullah Khan, Manalapan, NJ (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1306 days.

(21) Appl. No.: 09/660,092

(22) Filed: Sep. 12, 2000

(51) Int. Cl.
*H04L 1/00* (2006.01)
*G08C 25/02* (2006.01)
*G08C 25/00* (2006.01)

(52) U.S. Cl. ............... 370/216; 370/229; 370/236; 714/748; 714/799

(58) Field of Classification Search ............ 370/229, 370/282, 329, 216, 236; 714/748, 758, 799
See application file for complete search history.

(56) References Cited

U.S. PATENT DOCUMENTS

| | | | | |
|---|---|---|---|---|
| 4,829,524 A | * | 5/1989 | Yoshida | 714/748 |
| 5,477,550 A | * | 12/1995 | Crisler et al. | 714/748 |
| 5,537,416 A | * | 7/1996 | MacDonald et al. | 714/748 |
| 5,636,230 A | * | 6/1997 | Marturano et al. | 714/748 |
| 6,505,034 B1 | * | 1/2003 | Wellig | 455/69 |
| 6,519,731 B1 | * | 2/2003 | Huang et al. | 714/751 |
| 6,704,898 B1 | * | 3/2004 | Furuskar et al. | 714/751 |
| 6,778,558 B2 | * | 8/2004 | Balachandran et al. | 370/470 |

FOREIGN PATENT DOCUMENTS

WO    WO 0045543    8/2000

OTHER PUBLICATIONS

Kallel et al.; An adaptive incremental redundancy selective-repeat ARQ scheme for finite buffer receivers; Apr. 7-11, 1991; INFOCOM '91. Proceedings. Tenth Annual Joint Conference of the IEEE Computer and Communications Societies. Networking in the 90s. IEEE; vol. 2; pp. 791-796.*
Qui et al.; Performance enhancement of incremental redundancy in wireless data networks by measurement-based transmission control; Vehicular Technology Conference, 1999. VTC 1999—Fall. IEEE VTS 50th; vol. 1, Sep. 19-22, 1999; pp. 517-522.*
Qui et al. ; Performance comparison of link adaptation and incremental redundancy in wireless data networks; Wireless Communications and Networking Conference, 1999. WCNC. 1999 IEEE; vol. 2, Sep. 21-24, 1999; pp. 771-775.*
Pursley et al.; Incremental-redundancy transmission for meteorburst communications; Communications, IEEE Transactions on; vol. 39, Issue 5, May 1991, pp. 689-702.*
European Search Report.

* cited by examiner

*Primary Examiner*—Chi Pham
*Assistant Examiner*—Tri H. Phan

(57) ABSTRACT

An ARQ method using Incremental Redundancy that can be used in either synchronous or asynchronous communication systems. Information received by receiving equipment contains a one-bit NEW/CONTINUE flag indicating whether the received information is the beginning of new information or the continuation (or retransmission) of previously transmitted information. An ACK message is transmitted by the receiving equipment when such equipment receives information containing a NEW flag and successfully decodes such information. The receiving equipment also transmits an ACK message when it receives information containing a CONTINUE flag while it was waiting for NEW information. Thus, the method of the present invention allows for relatively quick recovery from misinterpretations of ACK/NACK messages and accommodates subscribers having different transmission requirements.

14 Claims, 1 Drawing Sheet

METHOD AND APPARATUS FOR ASYNCHRONOUS INCREMENTAL REDUNDANCY RECEPTION IN A COMMUNICATION SYSTEM

RELATED APPLICATION

Related subject matter is disclosed in the following application concurrently filed herewith: U.S. patent application Ser. No. 09/660,098, entitled "Method and Apparatus For Asynchronous Incremental Redundancy Transmission In A Communication System." filed Sep. 12, 2000.

BACKGROUND OF THE INVENTION

1. Field of the Invention

The present invention relates to a method for an Automatic Repeat Request (ARQ) technique for communication systems.

2. Description of the Related Art

The quality of communication channels within communication systems determines the efficiency of the communication system. One measure of efficiency is the system's throughput. The throughput is the amount of information that is successfully transmitted and received in a communication system for a defined period of time. It is therefore a goal of service providers (owners and operators of communication systems) to have as many of their communication channels as possible operating at an acceptable throughput.

In wireless communication systems, the communication channels used by a subscriber of such a system are commonly known as the air interface. The air interface is used for the exchange of information between a mobile (e.g., cell phone) and a base station or other communication system equipment. The air interface comprises a plurality of communication channels. The quality of any one of the channels of the air interface varies. Thus, for example, any particular channel between the base station and a mobile may have an acceptable throughput at one instant and unacceptable throughput at another instant. Service providers not only want to maintain the throughput of their air interface at an acceptable level, but also want to increase the throughput as much as possible.

Many times the information transmitted through a relatively low quality communication channel is adversely affected to such an extent that the information contains errors when received. In an effort to increase the throughput of such channels, communication systems apply the technique of retransmission of information. Transmitting equipment retransmits the information to receiving equipment a certain number of times to increase the likelihood that the information, once received, contains no errors or contains an acceptable number of errors. The receiving equipment can be either system equipment such as a base station or subscriber equipment such as a cell phone. Similarly, the transmitting equipment can also be system equipment or subscriber equipment. System equipment is any equipment owned and operated by the service provider.

A widely used technique for the retransmission of information due to errors detected at the receiving equipment is called Automatic Retransmission Request (ARQ). The ARQ method is a technique of confirming that information transmitted through a communication channel has been received without any errors. Receiving equipment sends a message to transmitting equipment confirming that the transmitted information was received without errors. If the transmitted information was received with errors, the receiving equipment sends a message to the transmitting equipment asking the transmitter to retransmit the information. The transmitter can retransmit all or part of the previously transmitted information using the same or different channel coding.

ARQ is typically used in concert with channel coding. Channel coding is the creation of redundancy in the transmitted information to allow receiving equipment to check as well as correct for errors. Also, the receiving equipment performs a corresponding decoding operation to obtain the information. The decoding operation is performed by a decoder. Two of the main ARQ methods are the Selective Retransmit (SR) protocol and the Stop-and-Wait protocol. In both SR ARQ and Stop-and-Wait ARQ, the concept of Incremental Redundancy (IR) is used. Incremental Redundancy (IR) and/or soft combining, are techniques used to improve the efficiency of ARQ. In IR, the receiving equipment attempts to combine, in the decoder, retransmitted information along with earlier transmissions of the same information that used the same or different coding. The decoding of combined information improves the performance of the decoding operation and increases the likelihood of successful decoding; decoding of combined information reduces the number of retransmissions that would be required to successfully receive the transmitted information. In the prior art, IR schemes that operate with SR ARQ and with Stop-and-Wait ARQ have been defined.

In the IR scheme operating with SR ARQ, information is typically encoded, formatted and packaged as packets comprising payload, header and trailer portions. The trailer and header portions are overhead in that they do not contain subscriber information; they contain information identifying the subscriber (i.e., identification information) and information on how to process the packet (i.e., process information). The information identifying the particular subscriber from whom the information in the payload of the packet originated is kept in the header. Also, the header contains information on how to soft combine, at the decoder, the received packets so as to properly decode the payload information.

An arbitrary number of copies of each block of information can be sent so that the original information can be derived from one or from a combination of the received packets of information. Different subscribers can transmit different amounts of information and at different rates. As described above, however, much information is needed to describe how the information is to be processed once it is received. The SR protocol is not bandwidth efficient because of the excessive overhead information. However, without the use of the header information, the receiving equipment is not able to identify, and properly combine and decode the received packets of information. To reduce the likelihood that the header information is contaminated resulting in errors, the header portion of the packets is heavily coded. The heavy coding is more robust coding that requires more redundancy to be added to the header information. Thus, the heavy coding creates even more overhead, which reduces the throughput of the communication channels thus reducing the efficiency of the communication system.

In the IR scheme with Stop-and-Wait ARQ protocol, a block of information is coded into n packets where n is an integer equal to 2 or greater. Each one of the packets by itself or in combination with another packet or a portion of another packet can be used to decode the original block of information. One or more of the packets are transmitted during a time slot(s) assigned to a particular subscriber. The transmitted packets are received and decoded. If the decoding was successful (i.e., no errors detected or an acceptable number of errors detected), the receiving equipment transmits an ACK (ACKnowledge) message to the transmitting equipment indicating that the information was properly decoded and that a new block of information can be transmitted. If the decoding was unsuccessful (i.e., error detected or an unacceptable number of errors detected), the receiving equipment transmits a NACK (Negative ACKnowledge) which is an indication to the transmitting equipment to retransmit another group of packets (or another single packet) representing the same block of information. The ACK message is thus an example of a positive confirmation message and the NACK message is an example of a negative confirmation message. Upon reception of a NACK message the receiving equipment stores the received error-containing packet. The receiving equipment will attempt to combine this stored packet with subsequent repeat packet transmissions for the same block of information, to properly decode the information within such block. The ACK or NACK confirmation messages are hereinafter referred to as the ACK/NACK messages.

The receiving equipment transmits the ACK/NACK message following the reception of a packet in a particular time slot assigned to a subscriber. Thus, the ACK/NACK messages are transmitted in accordance with a particular timing relationship to the packet reception. The transmit equipment associates a particular ACK/NACK message with a particular packet transmission based on the time slot or the time period within which such a message was received. For example, an ACK/NACK message received during slot period m corresponds to a packet transmission in slot m-k, where k represents a particular number (including fractions of time slots) of time slots which is fixed by the communication system; m is an integer equal to 1 or greater and k is a number greater than zero. The number of time slots represented by k is a roundtrip delay for transmitting equipment representing the time elapsed between a transmission of a packet and the reception of a responding ACK/NACK message.

Upon receipt of a NACK (in a particular time slot) in response to a packet transmission, the transmitting equipment transmits a repeat packet representing the same block of information. The transmitting equipment transmits the repeat packet transmission a certain number of time slots following the receipt of the ACK/NACK message. Thus, the repeat packet is transmitted in accordance with a particular timing relationship to the received ACK/NACK message.

The receive equipment associates a particular repeat packet transmission with a ACK/NACK message based on the time slot or the time period within which such a message was received. For example, a repeat packet transmission received during slot period n corresponds to a ACK/NACK message transmitted in slot n-j, where j represents a certain number of time slots (including fractions of time slots) which is fixed by the communication system; n is an integer equal to 1 or greater and j is a number greater than zero. The number of time slots represented by j is a roundtrip delay for receiving equipment representing the time elapsed between the transmission of an ACK/NACK message and the reception of a repeat packet. Therefore, there is no need to transmit identification information in the headers of the packets because the packets can be identified and soft combined based on the time slot in which they were received.

The Stop-and-Wait protocol in the prior art is thus a Synchronous Protocol in that the repeat packet transmissions are transmitted within a strict timing relationship (defined by the communication system) between transmitting equipment and receiving equipment. Consecutive packet transmissions of the same block of data are separated by a time period usually expressed in terms of number of slots where such time period is constant. In sum, when a transmission is made, an ACK/NACK message indicating a NACK (or ACK) followed by a repeated packet transmission (or a new packet transmission) must be transmitted a certain fixed number of slots later.

The Stop-and-Wait protocol as implemented in the prior art, has several drawbacks stemming from its synchronous nature and the manner in which it is typically implemented. Because of the strict timing relationship imposed on the transmissions, it is very difficult to accommodate different subscribers having different transmission rates or different roundtrip delays. Subscribers having different transmission rates transmit (or receive) information within different number of assigned consecutive time slots. For example, some subscribers use three time slots to transmit (or receive) their block of information while others use only one time slot. The transmission roundtrip delay is the amount of time elapsed between consecutive transmissions of packets or group of packets. In the Stop-and-Wait protocol, the transmission roundtrip delay is kept fixed.

A major drawback of the Stop-and-Wait protocol is the resulting loss of synchronization between transmission equipment and receiving equipment for a relatively long period of time when an ACK/NACK message is misinterpreted. For whatever reasons or conditions that occur in a communication channel, many times an ACK will be received and misinterpreted as a NACK or vice versa. The misinterpretation of the ACK/NACK messages causes the receiving equipment to process improperly the received block of information and lose synchronization with the transmitting equipment. For example, suppose a block of information (e.g., a packet) is transmitted and then received erroneously. The receiving equipment stores the received block of information and transmits a NACK message to the transmitting equipment. However, the NACK message is adversely affected by the channel and is interpreted as an ACK message. The transmitting equipment will then improperly transmit a new block of information to the receiving equipment. The receiving equipment receives the block of information and interprets it as a retransmission. Accordingly, the receiving equipment combines this received block of information with the stored block of information; the combination operation is improper here because a new block of information was transmitted. As a result, the combined block of information will generate errors when it is decoded causing the receiving equipment to send a second NACK message. At this point the transmitting equipment has lost synchronization with the receiving equipment. Losing synchronization refers to the receiving equipment and the transmitting equipment interpreting the same information differently. For example, in the sequence of events described above, a block of information is interpreted as a NACK message by the receiving equipment but the transmitting equipment interprets the same block of information as an ACK message. Further subsequent new transmissions by the transmitting equipment will be interpreted as retransmissions by the receiving equipment.

Therefore, what is needed is an ARQ technique that provides a mechanism for relatively fast recovery from misinterpretations of confirmation messages.

SUMMARY OF THE INVENTION

The present invention provides a method which implements an ARQ technique used with Incremental Retransmission (IR) that allows receiving equipment to recover, in a relatively short period of time, from misinterpretations of confirmation messages transmitted by such receiving equipment. The receiving equipment decides which confirmation message to transmit based on the value of an information status flag contained in received information and the result of a decoding operation performed on the received information thus providing a technique for recovering from misinterpretations of previous confirmation message transmissions. The method of the present invention can be used in wireless communication systems and other types of communication systems.

At the initial stage of the method of the present invention, information received by receiving equipment is processed to determine if it is new or part of information that is currently being transmitted, i.e., continue information. The received information contains, inter alia, an information status flag indicating whether the information is NEW information or CONTINUE information. Initially, the receiving equipment is waiting for NEW information. If the status flag indicates that the received information is NEW, a decoding operation is performed on the information. If the status flag indicates that the received information is CONTINUE, a positive confirmation message (e.g., ACK) is transmitted by the receiving equipment which then once again waits for NEW information.

Continuing with the case where the received information was new resulting in a decoding operation: If the decoding is successful, a positive confirmation message (e.g., ACK) is transmitted by the receiving equipment which then waits for another new block of information after returning to the initial stage of the method of the present invention. If the decoding is not successful, a negative confirmation message (e.g., NACK) is transmitted by the receiving equipment, which then stores the received information and waits for CONTINUE information. While waiting for CONTINUE information, if the next information received is CONTINUE information, it is combined with the stored information and performs a decoding operation. However, if the next transmitted information was NEW information, a decoding operation is immediately performed.

Therefore, the method of the present invention causes receiving equipment to always sends a positive confirmation message whenever the receiving equipment receives CONTINUE information while waiting for NEW information. Further, regardless of whether the receiving equipment is waiting for NEW or CONTINUE information, when the information is NEW, a decoding operation is immediately performed. The combining previously received information with current received information and decoding the combined information is performed only when the receiving equipment is waiting for CONTINUE information and indeed receives CONTINUE information.

DETAILED DESCRIPTION

Figure 1:
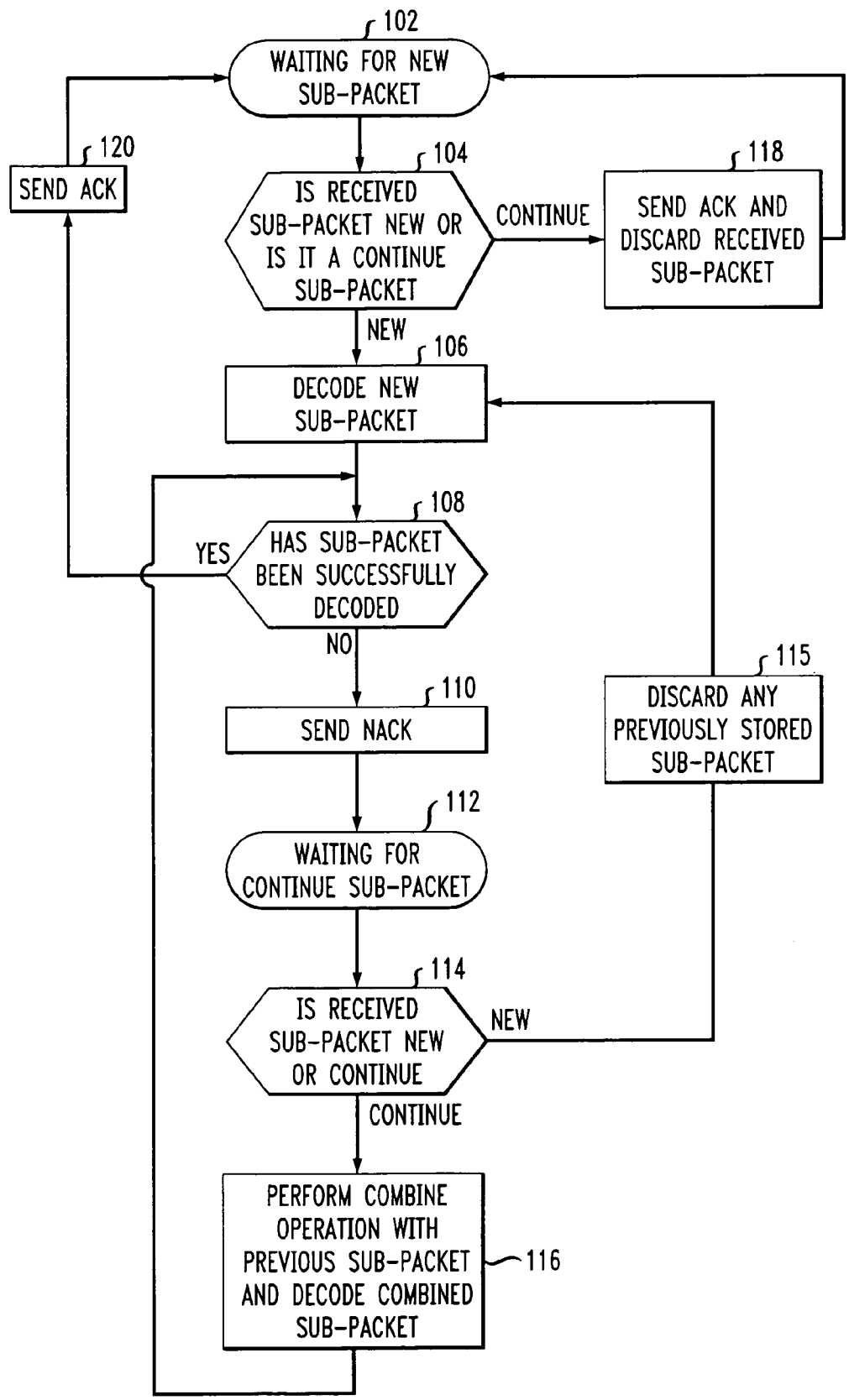
FIG. 1 shows a flowchart depicting the steps of the method of the present invention.

The present invention provides a method that implements an ARQ technique used in communication systems, which method allows for relatively fast recovery from misinterpretations of previous confirmation message transmissions. The previous confirmation messages represent the very last confirmation message transmitted by the receiving equipment. The misinterpretation is committed by transmitting equipment which receive confirmation messages from the receiving equipment. The method of the present invention is described from the standpoint of receiving communication equipment. The present invention also provides an apparatus that allows for relatively fast recovery from misinterpretations of confirmation message transmissions. The apparatus may be implemented as hardware (i.e., digital and/or analog hardware), microprocessor and/or digital processor based circuitry used in conjunction with firmware and/or software. The apparatus resides in both transmitting equipment and receiving equipment.

The information being received is categorized as either NEW information or CONTINUE information. NEW information represents the beginning of the information being transmitted. CONTINUE information represents information that follows the NEW information and is part of the NEW information. CONTINUE is thus the continuation of previously transmitted information or the retransmission of previously transmitted information that was decoded unsuccessfully. The information is formatted into blocks of information. Each block of information is coded and segmented into a plurality of sub-blocks. Depending on the type of coding used, each sub-block may contain information representing an entire block of information or part of an entire block of information. Therefore, depending on the coding, the entire block of information can be decoded from one sub-block or several sub-blocks may be needed to decode the block of information.

Referring to FIG. 1, there is shown the method of the present invention for receiving equipment in a communication system that uses ARQ. For ease of explanation, the received information are sub-packets of information resulting from packets of information being coded by a channel coder and segmented into one or more sub-packets. Each sub-packet contains, preferably in its header, an information status flag (hereinafter "NEW/CONTINUE" flag) and subscriber identification information. The NEW/CONTINUE flag is preferably a one-bit flag where a 0 bit indicates CONTINUE information and a 1 bit indicates NEW information. It should be noted that the NEW/CONTINUE flag can use more than one bit to indicate the status of the received information, but in the interest of reducing overhead a one-bit flag is preferable. The subscriber identification information associates each sub-packet to a particular subscriber. Because the flag uses only one bit, the coding of this flag does not use much overhead even when the flag is heavily coded; heavy coding refers to additional amounts of redundancy used to perform the coding operation. It should be noted that the NEW/CONTINUE flag can be stored anywhere in a sub-packet or anywhere in any other type of block of information. As previously stated, the NEW/CONTINUE flag can be more than one bit. For example, the NEW/CONTINUE flag can be implemented with two bits wherein each two bit value not only identifies the type of information contained in the sub-packet but also identifies the particular sub-packet in terms of the sequence of sub-packets. The two-bit flag thus assists equipment receiving the sub-packets to perform various operations such as decoding and combining of packets. For example, a two-bit flag for a group of 3 packets may be used as follows:

00—NEW sub-packet; 01—CONTINUE sub-packet 1; 10—CONTINUE sub-packet 2; 11—CONTINUE sub-packet 3. It should also be noted that the NEW/CONTINUE flag and the identification information may be transmitted separately from the sub-packet payload. For example, the identification information and the information status flag can be transmitted and received on a separate code multiplexed channel in a CDMA (Code Division Multiple Access) communication system, or separate time slots may be reserved for these fields in a TDMA (Time Division Multiple Access) communication system.

In step 102, receiving equipment is waiting for new information. In step 104, the receiving equipment has received a sub-packet and determines whether the received sub-packet is NEW or CONTINUE information. The receiving equipment examines the NEW/CONTINUE flag within the header of the received sub-packet. If the flag indicates CONTINUE information, the method of the present invention moves to step 118 where it transmits a positive confirmation message (e.g., ACK), discards the received sub-packet and returns to step 102 where it again waits for NEW information (i.e., a NEW packet).

Returning to step 104, if the received sub-packet is determined to be NEW information, the method of the present invention moves to step 106 where it performs a decoding operation on the received sub-packet. The decoding operation not only decodes the received sub-packet that was sent, but also detects any errors in the received sub-packet. In step 108, if the decoding operation does not contain any errors or if the decoding operation is somehow deemed successful by the service provider, the method of the present invention moves to step 120 where the receiving equipment transmits a positive confirmation message (e.g., ACK) and moves to step 102 to wait for NEW sub-packet. Note that a successful decoding may contain a certain number of errors; the service provider of the communication system can arbitrarily define a successful decoding operation. Conversely, an unsuccessful decoding operation occurs when errors are detected; the service provider may, however, arbitrarily define an unsuccessful decoding operation as one in which the number of errors detected has surpassed an arbitrary threshold.

Returning to step 108, if the decoding operation contains errors or is somehow deemed to be unsuccessful, the method of the present invention moves to step 110 where the receiving equipment transmits a negative confirmation message (e.g., NACK) and moves to step 112. The decoded error-containing sub-packet is stored for a future combination operation with a CONTINUE sub-packet. In step 112 the receiving equipment is waiting for a CONTINUE sub-packet. When a sub-packet is received, the method of the present invention moves to step 114 to determine the status of the received sub-packet. The status of the received sub-packet is determined, as before, by examining the NEW/CONTINUE flag. If the received sub-packet is NEW, the method of the present invention moves to step 115 where it discards any previously stored sub-packet and then moves to step 106 to perform a decode operation on the received sub-packet. If the received sub-packet is CONTINUE, the method of the present invention moves to step 116 where the received sub-packet is combined with a previously received sub-packet and the combination is decoded; that is, the received sub-packet is used in conjunction with a previously received sub-packet to perform a decoding operation. The combination is done in accordance with a predefined algorithm set by the service provider. The combination operation is performed when the previously received sub-packet was only part of a packet and thus could not be properly decoded. Also, the combination operation is performed when the previously received sub-packet could not be properly decoded due to errors and this newly received sub-packet can be used to help bolster the decoding process. After the combination and decoding operations are performed the method of the present invention moves to step 108 to determine if the decoding operation was successful. It should be noted that the combination operation preferably executes the combination of a received sub-packet with a previously received sub-packet. It should also be noted that the combination operation executes the combination of a received sub-packet with all or a subset of sub-packets received after the last NEW sub-packet and including the last NEW sub-packet.

The method of the present invention thus allows for relatively fast recovery from misinterpretations of confirmation messages; this is shown more clearly by focusing on the following steps: Returning to step 120 for a moment, suppose the ACK message transmitted by the receiving equipment is interpreted as a NACK message. Accordingly, the transmitting equipment sends a sub-packet containing a CONTINUE flag to the receiving equipment which is now at step 102. In accordance with the method of the present invention, the receiving equipment would move to step 118 and transmit an ACK message immediately giving the transmitting equipment an opportunity to move on transmit the next NEW information.

Another type of misinterpretation can occur after step 110 is performed wherein a NACK message was transmitted. The method of the present invention moves to step 112 to wait for a sub-packet containing a CONTINUE flag. Suppose the NACK message is interpreted by the transmitting equipment as an ACK message. Accordingly, the transmitting equipment transmits a new sub-packet which is decoded immediately (step 114 followed by step 106) preventing the receiving equipment from waiting indefinitely for CONTINUE information.

The method also allows for recovery from a misinterpretation or loss of identification information in the header of transmitted sub-packet. Two situations are examined: (1) misinterpretation or loss of header information while waiting for NEW information and (2) misinterpretation or loss of header information while waiting for CONTINUE information. For the first situation we return to step 102 for the moment: a NEW sub-packet is transmitted to the receiving equipment. Due to channel errors, the header information is contaminated preventing the receiving equipment from identifying the sub-packet. Consequently, the receiving equipment does not transmit a confirmation message in response to the transmitted packet. In some realizations, the transmitter equipment will interpret a lack of a confirmation message as an implicit negative confirmation message and transmit a CONTINUE sub-packet. Upon reception of the receiver sub-packet (assuming the header information was properly interpreted) the receiver transmits and ACK (steps 104 followed by step 118) and returns to step 102 to wait for the transmission of the next sub-packet. For the second situation, we return to step 112 where the receiving equipment is waiting for CONTINUE information. In this case, the receiving equipment having missed a CONTINUE sub-packet will attempt to combine a subsequent CONTINUE sub-packet with stored sub-packets (steps 114 and 116). However the decoding at step 116 may not be successful because of the missed sub-packet. At some point, the transmitter will move on to the transmission of the NEXT sub-packet causing the method of the present invention to move to step 115 (discard previously stored sub-packets) and then to step 106 to perform a decoding operation on the received NEW sub-packet. It is in this manner that the method of the present invention recovers from lost sub-packets due to misinterpretation or contamination of identification information.

We claim:

1. A method for receiving information in a communication system, the method comprising:

deciding which of a plurality of confirmation messages to transmit based on an information status flag indication contained in the received information and a decoding operation performed on the received information to recover from misinterpretation of a previous confirmation message transmission.

2. The method of claim 1 wherein the step of deciding which of the plurality of confirmation messages to transmit comprises waiting for NEW information.

3. The method of claim 1 further comprising waiting for NEW information after a positive confirmation message was transmitted.

4. The method of claim 1 further comprising transmitting a positive confirmation message after receiving NEW information while waiting for either NEW or CONTINUE information, decoding said received NEW information successfully and discarding any previously received information.

5. The method of claim 1, where the step of deciding which of the plurality of confirmation messages to transmit further comprises transmitting a positive confirmation message if the received information is NEW information and the decoding operation was successful.

6. The method of claim 1 where the step of deciding which of the plurality of confirmation messages to transmit further comprises transmitting a negative confirmation message if the received information is NEW information and the decoding operation was unsuccessful.

7. The method of claim 6 further comprising the steps of:

waiting for CONTINUE information after the negative confirmation message was transmitted;

combining received CONTINUE information with previously received information; and performing a decoding operation on the combined information.

8. A method for receiving information in a communication system, the method comprises the step of:

deciding which of a plurality of confirmation messages to transmit based on an information status flag contained in the received information, the information status flag indicating that the received information comprises at least one of new and continue information, and a decoding operation performed on the received information.

9. The method of claim 8, wherein the step of deciding which of the plurality of confirmation messages to transmit comprises waiting for new information.

10. The method of claim 8, further comprising waiting for new information after a positive confirmation message was transmitted.

11. The method of claim 8, further comprising transmitting a positive confirmation message after receiving an information status flag indicating that the received information comprises new information while waiting for either new or continue information, decoding said received new information successfully and discarding any previously received information.

12. The method of claim 8, where the step of deciding which of the plurality of confirmation messages to transmit further comprises transmitting a positive confirmation message if the information status flag indicates that the received information comprises new information and the decoding operation was successful.

13. The method of claim 8, where the step of deciding which of the plurality of confirmation messages to transmit further comprises transmitting a negative confirmation message if the information status flag indicates that the received information comprises new information and the decoding operation was unsuccessful.

14. The method of claim 13 further comprising the steps of:

waiting for continue information after the negative confirmation message was transmitted;

combining received continue information with previously received information; and performing a decoding operation on the combined information.

* * * * *